United States Patent
Dai et al.

(10) Patent No.: US 11,205,271 B2
(45) Date of Patent: Dec. 21, 2021

(54) METHOD AND DEVICE FOR SEMANTIC SEGMENTATION OF IMAGE

(71) Applicant: Beijing Tusen Zhitu Technology Co., Ltd., Beijing (CN)

(72) Inventors: Hengchen Dai, Beijing (CN); Naiyan Wang, Beijing (CN)

(73) Assignee: BEIJING TUSEN ZHITU TECHNOLOGY CO., LTD., Beijing (CN)

( * ) Notice: Subject to any disclaimer, the term of this patent is extended or adjusted under 35 U.S.C. 154(b) by 69 days.

(21) Appl. No.: 16/577,753

(22) Filed: Sep. 20, 2019

(65) Prior Publication Data

US 2020/0020102 A1 Jan. 16, 2020

Related U.S. Application Data

(63) Continuation of application No. PCT/CN2017/102031, filed on Sep. 18, 2017.

(30) Foreign Application Priority Data

Apr. 14, 2017 (CN) .......................... 201710247372.8

(51) Int. Cl.
*G06K 9/00* (2006.01)
*G06T 7/10* (2017.01)
(Continued)

(52) U.S. Cl.
CPC ................ *G06T 7/10* (2017.01); *G06F 17/15* (2013.01); *G06N 3/04* (2013.01); *G06T 2207/20081* (2013.01); *G06T 2207/20084* (2013.01)

(58) Field of Classification Search
CPC .. G06K 9/62; G06K 9/46; G06K 9/00; G06K 9/66; G06K 9/32; G06K 9/52; G06T 7/00;
(Continued)

(56) References Cited

U.S. PATENT DOCUMENTS 8,965,044 B1 * 2/2015 Owechko ............. G06K 9/6229
382/103
9,589,374 B1 * 3/2017 Gao ...................... G06T 11/008
(Continued)

FOREIGN PATENT DOCUMENTS

CN 104573669 A 4/2015
CN 104700099 A 6/2015
(Continued)

OTHER PUBLICATIONS

International Application No. PCT/CN2017/102031, International Search Report and Written Opinion dated Jan. 11, 2018.

*Primary Examiner* — Quan M Hua
(74) *Attorney, Agent, or Firm* — Paul Liu; Julie J. Muyco; Perkins Coie, LLP

(57) ABSTRACT

The present disclosure provides a method and an apparatus for semantic segmentation of an image, capable of solving the problem in the related art associated with low speed and inefficiency in semantic segmentation of images. The method includes: receiving the image; performing semantic segmentation on the image to obtain an initial semantic segmentation result; and inputting image information containing the initial semantic segmentation result to a pre-trained convolutional neural network for semantic segmentation post-processing, so as to obtain a final semantic segmentation result. With the solutions of the present disclosure, the initial semantic segmentation result can be post-processed using the convolutional neural network, such (Continued)

that the speed and efficiency of the semantic segmentation of the image can be improved.

21 Claims, 8 Drawing Sheets

(51) Int. Cl.
*G06F 17/15* (2006.01)
*G06N 3/04* (2006.01)

(58) Field of Classification Search
CPC ... G06T 7/11; G06T 7/174; G06T 7/73; G06T 19/00; G06T 19/20; G06T 7/143; G06T 7/194; G06T 7/20; G06T 11/00; G06T 17/20; G06T 5/00; G06T 7/12; G06T 7/13; G06T 7/136; G06T 7/246; G06N 3/08; G06N 3/04; G06N 20/00; G06N 5/04; A61B 8/08; A61B 5/055; A61B 5/00; A61B 6/00; A61B 8/00; A61B 17/00; A61B 34/10; A61B 6/03; A61B 8/12

See application file for complete search history.

(56) References Cited

U.S. PATENT DOCUMENTS

| | | |
|---|---|---|
| 2016/0171341 A1 | 6/2016 | Jeon |
| 2016/0174902 A1* | 6/2016 | Georgescu ............ G06T 7/0012 600/408 |
| 2016/0358024 A1 | 12/2016 | Krishnakumar et al. |
| 2018/0268284 A1* | 9/2018 | Ren .......................... G06N 3/04 |

FOREIGN PATENT DOCUMENTS

| | | |
|---|---|---|
| CN | 105787510 A | 7/2016 |
| CN | 10604522 A | 12/2016 |
| CN | 106447658 A | 2/2017 |
| CN | 106548192 A | 3/2017 |
| CN | 106886801 A | 6/2017 |

* cited by examiner

METHOD AND DEVICE FOR SEMANTIC SEGMENTATION OF IMAGE

CROSS REFERENCE TO RELATED APPLICATIONS

This application is a patent application under 35 U.S.C. § 120 and is a continuation of and claims priority to International Patent Application No. PCT/CN2017/102031, filed on Sep. 18, 2017, which further claims the benefit of priority of Chinese Patent Application No. 201710247372.8, filed Apr. 14, 2017. The entire contents of the before-mentioned patent applications are incorporated by reference as part of the disclosure of this application.

TECHNICAL FIELD

The present disclosure relates to computer technology, and more particularly, to a method and an apparatus for semantic segmentation of an image.

BACKGROUND

Currently, semantic segmentation of images is required in various application scenarios such as object identification and object detection. The purpose of semantic segmentation of an image is to categorize each pixel in the image, i.e., to add a category label to each pixel.

Since there is a low correlation between pixels, an initial semantic segmentation result obtained by performing semantic segmentation on an image using an existing method for sematic segmentation of the image based on conventional deep learning may be inaccurate and thus further post-processing of the initial semantic segmentation result may be needed. By means of post processing, erroneous results in the initial semantic segmentation result can be corrected.

Currently, commonly used post-processing schemes are graph models, e.g., a Conditional Random Field (CRF) model, a Markov random field model, etc.

The CRF is a probability model based on an undirected graph for marking sequential data and has a high probabilistic inference capability. Assuming that each pixel i has a category label $y_i$ and an observed value $x_i$, a CRF can be constructed, as shown in FIG. 1, with each pixel being a node and a relation between pixels being an edge. The category label $x_i$ corresponding to the pixel i can be inferred by observing the variable $y_i$ for the pixel i.

The CRF follows a Gibbs distribution:

$$P(X = x \mid I) = \frac{1}{Z(I)} \exp(-E(x \mid I))$$

where x is the above observed value, and E(x|I) is an energy function. For simplicity, a global observation I can be omitted from the energy function to yield:

$$E(x) = \sum_i \psi_u(x_i) + \sum_{i<j} \psi_p(x_i, y_i)$$

where $$\sum_i \psi_u(x_i)$$

is a unary potential function obtained from an output from a front-end FCN, and $\psi_p(x_i, y_i)$ is a binary potential function which can be in particular:

$$\psi_p(x_i, y_i) = u(x_i, y_i) \sum_{m=1}^{M} \omega^{(m)} k_G^{(m)}(f_i, f_j).$$

The binary potential function is used for describing a relation between pixels. A same category label can be assigned to pixels having small differences, and different category labels can be assigned to pixels having large differences. The difference between two pixels can be evaluated and represented as a "distance", which depends on color values of the two pixels and an actual relative distance between the two pixels.

With the CRF, an image can be segmented at its edge as possible, such that erroneous results in an initial semantic segmentation result can be corrected to some extent, thereby improving the accuracy of the semantic segmentation result. However, the CRF needs to consider the correlation between every pair of pixels, which involves a large amount of computation, and thus this post-processing scheme is slow and inefficient.

SUMMARY

In view of the above problem, the present disclosure provides a method and an apparatus for semantic segmentation of an image, capable of improving the efficiency and accuracy of semantic segmentation.

In an aspect, according to an embodiment of the present disclosure, a method for semantic segmentation of an image is provided. The method includes: receiving the image; performing semantic segmentation on the image to obtain an initial semantic segmentation result; and inputting image information containing the initial semantic segmentation result to a pre-trained convolutional neural network for semantic segmentation post-processing, so as to obtain a final semantic segmentation result.

In another aspect, according to an embodiment of the present disclosure, an apparatus for semantic segmentation of an image is provided. The apparatus includes: a receiving unit configured to receive the image; a segmenting unit configured to perform semantic segmentation on the image to obtain an initial semantic segmentation result; and a post-processing unit configured to input image information containing the initial semantic segmentation result to a pre-trained convolutional neural network for semantic segmentation post-processing, so as to obtain a final semantic segmentation result.

In yet another aspect, according to an embodiment of the present disclosure, an apparatus for semantic segmentation of an image is provided. The apparatus includes a processor and at least one memory storing at least one machine executable instruction. The processor is operative to execute the at least one machine executable instruction to: receive the image; perform semantic segmentation on the image to obtain an initial semantic segmentation result; and input image information containing the initial semantic segmentation result to a pre-trained convolutional neural network for semantic segmentation post-processing, so as to obtain a final semantic segmentation result.

With the solutions according to the present disclosure, after an initial semantic segmentation result is obtained by performing semantic segmentation on a received image, image information containing the initial semantic segmentation result can be inputted to a convolutional neural network for semantic segmentation post-processing, so as to obtain a final semantic segmentation result. With the image segmentation schemes according to the present disclosure, as the convolutional neural network is pre-trained, it can post-process the image information containing the initial semantic segmentation result quickly, without calculating correlations between respective pixels in the image as required in the CRF scheme in the related art, such that the speed and efficiency of the post-processing can be improved. The other features and advantages of the present disclosure will be explained in the following description, and will become apparent partly from the description or be understood by implementing the present disclosure. The objects and other advantages of the present disclosure can be achieved and obtained from the structures specifically illustrated in the written description, claims and figures.

In the following, the solutions according to the present disclosure will be described in detail with reference to the figures and embodiments.

BRIEF DESCRIPTION OF THE DRAWINGS

The figures are provided for facilitating further understanding of the present disclosure. The figures constitute a portion of the description and can be used in combination with the embodiments of the present disclosure to interpret, rather than limiting, the present disclosure. It is apparent to those skilled in the art that the figures described below only illustrate some embodiments of the present disclosure and other figures can be obtained from these figures without applying any inventive skills. In the figures.

DETAILED DESCRIPTION OF THE EMBODIMENTS

In the following, the solutions according to the embodiments of the present disclosure will be described clearly and completely with reference to the figures, such that the solutions can be better understood by those skilled in the art. Obviously, the embodiments described below are only some, rather than all, of the embodiments of the present disclosure. All other embodiments that can be obtained by those skilled in the art based on the embodiments described in the present disclosure without any inventive efforts are to be encompassed by the scope of the present disclosure.

The core idea of the present disclosure has been described above. The solutions according to the embodiments of the present disclosure will be described in further detail below with reference to the figures, such that they can be better understood by those skilled in the art and that the above objects, features and advantages of the embodiments of the present disclosure will become more apparent.

Figure 1:
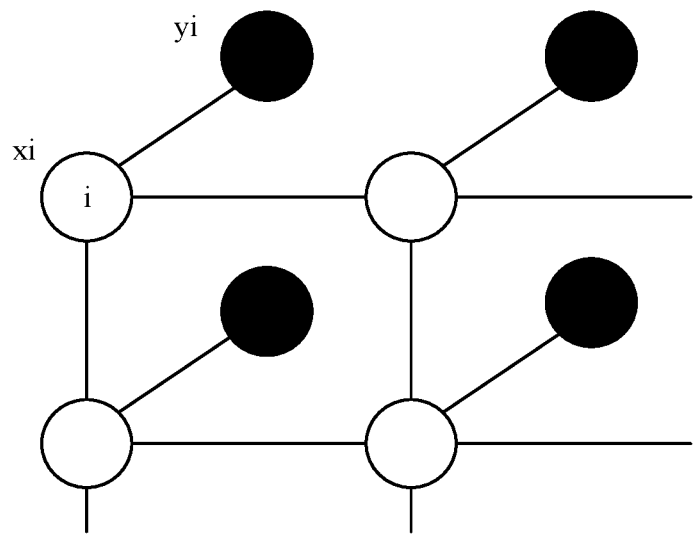
FIG. 1 is a schematic diagram showing a CRF in the related art.
Figure 2:
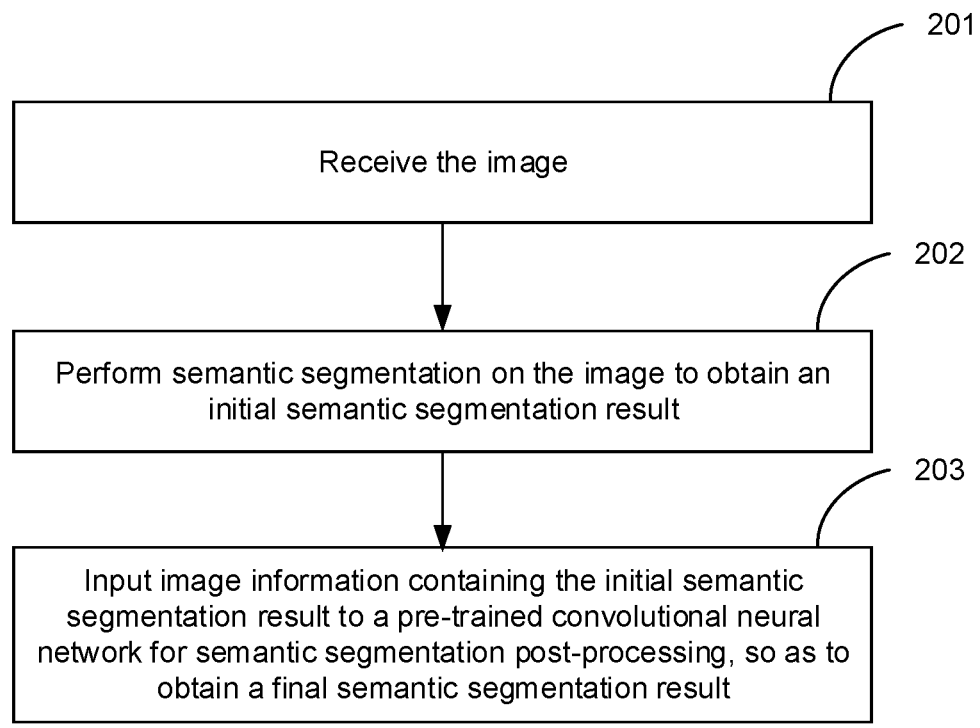
FIG. 2 is a flowchart illustrating a method for semantic segmentation of an image according to an embodiment of the present disclosure.

FIG. 2 is a flowchart illustrating a method for semantic segmentation of an image according to an embodiment of the present disclosure. Referring to FIG. 2, the method includes the following steps.

At step 201, the image is received.

At step 202, semantic segmentation is performed on the image to obtain an initial semantic segmentation result.

In an embodiment of the present disclosure, in the step 202, the semantic segmentation can be performed on the received image using a pre-trained neural network (e.g., a fully connected convolutional neural network) or using an image segmentation algorithm. The present disclosure is not limited to this.

In an embodiment of the present disclosure, the initial semantic segmentation result can be category labels (or referred to as "labels" hereinafter) to which respective pixels contained in the image belong.

Preferably, in order to reduce the distortion ratio of information and maintain the integrity of the information, in an embodiment of the present disclosure, the initial semantic segmentation result inputted to the convolutional neural network can be a confidence map, instead of the label representations of the respective pixels in the image. For example, a number, n, of category labels, e.g., bicycle, car, tricycle, pedestrian, road surface, fence, streetlight, tree, traffic light or the like, can be predefined and the initial semantic segmentation result can be a value of a probability that each pixel in the image belongs to each of these category labels.

At step 203, image information containing the initial semantic segmentation result is inputted to a pre-trained convolutional neural network for semantic segmentation post-processing, so as to obtain a final semantic segmentation result.

With the solutions according to the present disclosure, after an initial semantic segmentation result is obtained by performing semantic segmentation on a received image, image information containing the initial semantic segmentation result can be inputted to a convolutional neural network for semantic segmentation post-processing, so as to obtain a final semantic segmentation result. With the image segmentation schemes according to the present disclosure, as the convolutional neural network is pre-trained, it can post-process the image information containing the initial semantic segmentation result quickly, without calculating correlations between respective pixels in the image as required in the CRF scheme in the related art, such that the speed and efficiency of the post-processing can be improved.

In Embodiment 1 of the present disclosure, the image information may contain only the initial semantic segmentation result. Preferably, in order to further improve the accuracy of the post-processing using the convolutional neural network, the image information can contain the initial semantic segmentation result and at least one mode corresponding to the image and describing feature information of the image. The at least one mode may include one or more of: a visible image mode (e.g., an RGB mode or a Hue, Saturation and Value (HSV) mode), a depth mode, a Computed Tomography (CT) mode, an infrared mode, a millimeter wave mode or an ultrasound mode.

In practice, pixels belonging to the same category label generally have the same feature information. Thus, with the mode of the image, the correction of erroneous results in the initial semantic segmentation result can be more accurate. Accordingly, when the image information includes the at least one mode, the accuracy of the semantic segmentation result can be further improved.

In the following, several examples will be given to describe the solutions of the present disclosure in further detail.

Embodiment 1

In Embodiment 1, the convolutional neural network includes only one stage of convolutional neural network. In this case, the above step 203 can be implemented using the following steps A1~A2.

At step A1, the image information containing the initial semantic segmentation result can be inputted to the one stage of convolutional neural network to obtain a modified semantic segmentation result.

At step A2, the final semantic segmentation result can be obtained based on the modified semantic segmentation result.

In Embodiment 1 of the present disclosure, the image information may contain the initial semantic segmentation result only, or the initial semantic segmentation result and the at least one mode corresponding to the image.

In Embodiment 1 of the present disclosure, the modified semantic segmentation result is a semantic segmentation result obtained by correcting erroneous results in the initial semantic segmentation result using the convolutional neural network. If the initial semantic segmentation result is the labels of the respective pixels in the image, the modified semantic segmentation result is labels of the respective pixels in the image. If the initial semantic segmentation result is the confidence map, the modified semantic segmentation result is a confidence map.

In the embodiment of the present disclosure, when the modified semantic segmentation result is also a confidence map, in the above step A2, for each pixel in the image, a maximum value of the probability that the pixel belongs to each category label can be determined based on the modified semantic segmentation result and the category label having the largest probability value can be determined as the final category label to which the pixel belongs.

In the embodiment of the present disclosure, when the modified semantic segmentation result is labels of the respective pixels in the image, in the above step A2, the modified semantic segmentation result can be determined as the final semantic segmentation result.

Embodiment 2

Figure 3:
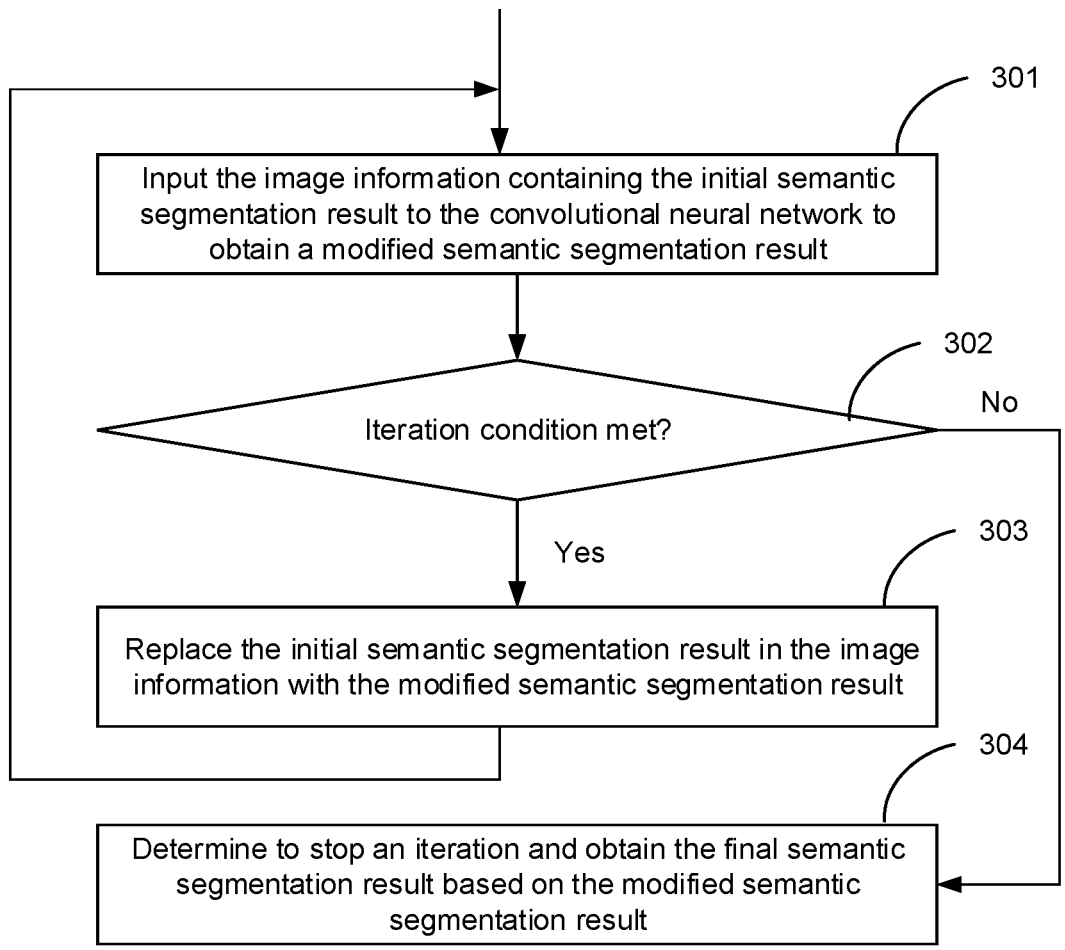
FIG. 3 is a first flowchart illustrating a method for semantic segmentation post-processing using a convolutional neural network according to an embodiment of the present disclosure.

In Embodiment 2, the convolutional neural network includes only one stage of convolutional neural network. In order to further improve the accuracy of the post-processing by the convolutional neural network, the convolutional neural network can be optimized iteratively for a number of times, until an optimization requirement is met. The final semantic segmentation result can be determined based on the modified semantic segmentation result obtained from the final iteration. In particular, the above step 203 can be implemented using a process shown in FIG. 3. The process includes the following steps.

At step 301, the image information containing the initial semantic segmentation result is inputted to the convolutional neural network to obtain a modified semantic segmentation result.

At step 302, it is determined whether an iteration condition is met. If so, the process proceeds with step 303; or otherwise the process proceeds with step 304.

At step 303, the initial semantic segmentation result in the image information is replaced with the modified semantic segmentation result and the above step 301 is repeated. In this case, the initial semantic segmentation result in the step 301 is the modified semantic segmentation result obtained in the step 301.

At step 304, it is determined to stop an iteration and the final semantic segmentation result is obtained based on the modified semantic segmentation result.

In Embodiment 2 of the present disclosure, the modified semantic segmentation result is a semantic segmentation result obtained by correcting erroneous results in the initial semantic segmentation result using the convolutional neural network. If the initial semantic segmentation result is the labels of the respective pixels in the image, the modified semantic segmentation result is labels of the respective pixels in the image. If the initial semantic segmentation result is the confidence map, the modified semantic segmentation result is a confidence map. In the embodiment of the present disclosure, when the modified semantic segmentation result is also a confidence map, in the above step 304, for each pixel in the image, a maximum value of the probability that the pixel belongs to each category label can be determined based on the modified semantic segmentation result obtained from the final iteration of the convolutional neural network and the category label having the largest probability value can be determined as the final category label to which the pixel belongs.

In the embodiment of the present disclosure, when the modified semantic segmentation result is labels of the respective pixels in the image, in the above step 304, the modified semantic segmentation result obtained from the final iteration of the convolutional neural network can be determined as the final semantic segmentation result.

In Embodiment 1 of the present disclosure, the image information may contain the initial semantic segmentation result only, or the initial semantic segmentation result and the at least one mode corresponding to the image.

In Embodiment 2 of the present disclosure, the iteration condition may include an accumulated number of iterations having reached a predetermined number threshold, or a modified semantic segmentation result currently outputted from the convolutional neural network and a semantic segmentation result previously outputted from the convolutional neural network satisfying a convergence condition. The present disclosure is not limited to any specific iteration condition. The above step 302 of determining whether the iteration condition is met can be, but not limited to be, implemented in any of the following two schemes.

Scheme 1: It can be determined whether an accumulated number of iterations has reached a predetermined number threshold, and if so, it is determined that the iteration condition is not met, or otherwise it is determined that the iteration condition is met. For example, a counter can be used to count the number of iterations and the counter can be incremented by 1 for each iteration.

Scheme 2: It can be determined whether a modified semantic segmentation result currently outputted from the convolutional neural network and a semantic segmentation result previously outputted from the convolutional neural network satisfy a convergence condition, and if so, it is determined that the iteration condition is not met, or otherwise it is determined that the iteration condition is met.

The convolutional neural network in Embodiment 1 and Embodiment 2 as described above can be pre-trained with a large number of sample images. For example, when the image information contains only the initial semantic segmentation result, the category labels to which the respective labels in the sample images belong can be identified in advance, referring to the training process shown in FIG. 4. For example, when the image information contains the initial semantic segmentation result and the at least one mode, the category labels to which the respective labels in the sample images belong can be identified and the values of the respective modes corresponding to the sample images can be determined in advance, referring to the training process shown in FIG. 5.

Embodiment 3

In Embodiment 3, in order to further improve the accuracy of the post-processing by the convolutional neural network, the convolutional neural network may consist of at least two stages of convolutional neural sub-networks having the same or different structures. Preferably, when the image information contains only the initial semantic segmentation result, the convolutional neural sub-networks at the respective stages may have different structures. Preferably, when the image information contains the initial semantic segmentation result and the at least one mode, the convolutional neural sub-networks at the respective stages may have the same or different structures. The present disclosure is not limited to this. The convolutional neural sub-networks at the respective stages can be configured flexibly by those skilled in the art depending on actual requirements, such that the convolutional neural sub-networks at the respective stages may have different optimization directions, thereby allowing comprehensive optimization of the initial semantic segmentation result. More preferably, when the convolutional neural sub-networks at the respective stages have the same structure, mode items corresponding to the convolutional neural sub-networks at the respective stages may be partly the same or completely different. When the convolutional neural sub-networks at the respective stages have different structures, other mode items corresponding to the convolutional neural sub-networks at the respective stages may be completely the same, partly the same or completely different.

When the image information contains only the initial semantic segmentation result, the above step 203 can be implemented using the following steps B1~B2.

At step B1, for each of the at least two stages of convolutional neural sub-networks, in a cascaded order: the initial semantic segmentation result is inputted to the convolutional neural sub-network at that stage to obtain a modified semantic segmentation result and the modified semantic segmentation result is used as an initial semantic segmentation result for the convolutional neural sub-network at the next stage.

It is to be noted here that, in the embodiment of the present disclosure, the initial semantic segmentation result inputted to the convolutional neural sub-network at the first stage is the initial semantic segmentation result obtained in the above step 202, and for any other stage, the initial semantic segmentation result inputted to the convolutional neural sub-network at the stage is the modified semantic segmentation result outputted from the convolutional neural sub-network at the previous stage.

At stage B2, the final semantic segmentation result is determined based on the modified semantic segmentation result outputted from the convolutional neural sub-network at the last stage.

When the image information contains the initial semantic segmentation result and the at least one mode, the above step 203 can be implemented using the following steps C1~C2.

At step C1, for each of the at least two stages of convolutional neural sub-networks, in a cascaded order, the initial semantic segmentation result and a mode among the at least one mode that corresponds to the convolutional neural sub-network at that stage are inputted to the convolutional neural sub-network at that stage to obtain a modified semantic segmentation result, and the modified semantic segmentation result is used as an initial semantic segmentation result for the convolutional neural sub-network at the next stage.

It is to be noted here that, in the embodiment of the present disclosure, the initial semantic segmentation result inputted to the convolutional neural sub-network at the first stage is the initial semantic segmentation result obtained in the above step 202, and for any other stage, the initial semantic segmentation result inputted to the convolutional neural sub-network at the stage is the modified semantic segmentation result outputted from the convolutional neural sub-network at the previous stage.

At step C2, the final semantic segmentation result is determined based on the modified semantic segmentation result outputted from the convolutional neural sub-network at the last stage.

Figure 6:
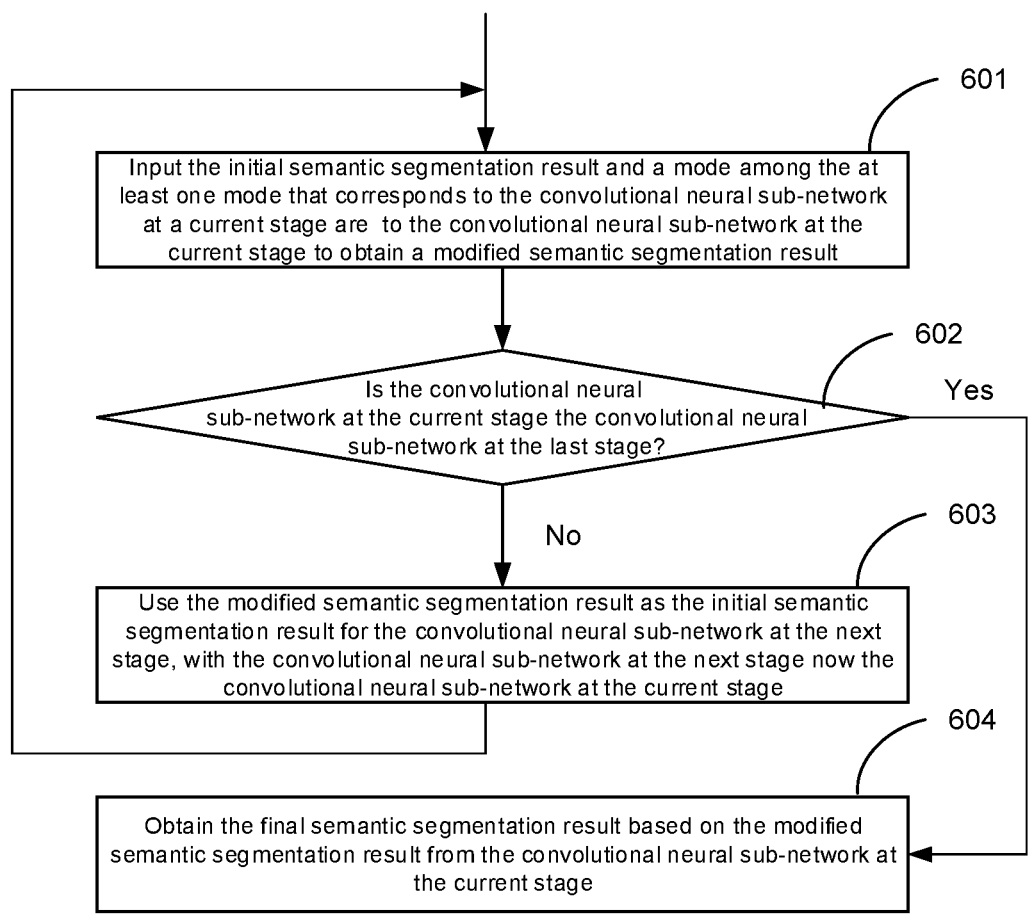
FIG. 6 is a second flowchart illustrating a method for semantic segmentation post-processing using a convolutional neural network according to an embodiment of the present disclosure.

More particular, the above steps C1~C2 can be implemented using the method process shown in FIG. 6. The method process includes the following steps.

At step 601, the initial semantic segmentation result and a mode among the at least one mode that corresponds to the convolutional neural sub-network at a current stage are inputted to the convolutional neural sub-network at the current stage to obtain a modified semantic segmentation result.

At step 602, it is determined whether the convolutional neural sub-network at the current stage is the convolutional neural sub-network at the last stage. If so, the process proceeds with step 604; or otherwise the process proceeds with step 603.

At step 603, the modified semantic segmentation result is used as the initial semantic segmentation result for the convolutional neural sub-network at the next stage, and the convolutional neural sub-network at the next stage is now the convolutional neural sub-network at the current stage. The process proceeds with the step 601.

At step 604, the final semantic segmentation result is obtained based on the modified semantic segmentation result from the convolutional neural sub-network at the current stage.

In Embodiment 3 of the present disclosure, the modified semantic segmentation result is a semantic segmentation result obtained by correcting erroneous results in the initial semantic segmentation result inputted to the convolutional neural network using the convolutional neural network. If the initial semantic segmentation result is the labels of the respective pixels in the image, the modified semantic segmentation result is labels of the respective pixels in the image. If the initial semantic segmentation result is the confidence map, the modified semantic segmentation result is a confidence map.

In Embodiment 3 of the present disclosure, when the modified semantic segmentation result is also a confidence map, in the above step B2 or C2, for each pixel in the image, a maximum value of the probability that the pixel belongs to each category label can be determined based on the modified semantic segmentation result outputted from the convolutional neural sub-network at the last stage and the category label having the largest probability value can be determined as the final category label to which the pixel belongs.

In the embodiment of the present disclosure, when the modified semantic segmentation result is labels of the respective pixels in the image, in the above step B2 or C2, the modified semantic segmentation result obtained from the convolutional neural sub-network at the last stage can be determined as the final semantic segmentation result.

Figure 4:
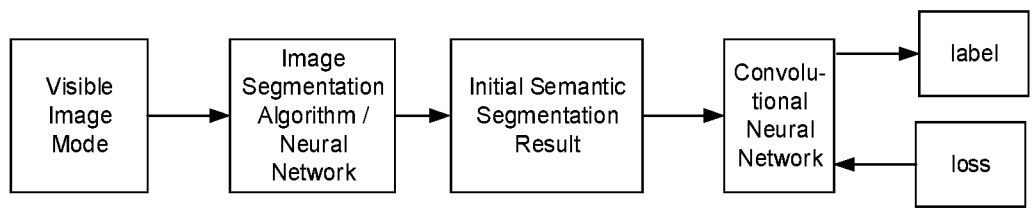
FIG. 4 is a first schematic diagram showing training of a convolutional neural network according to an embodiment of the present disclosure.
Figure 5:
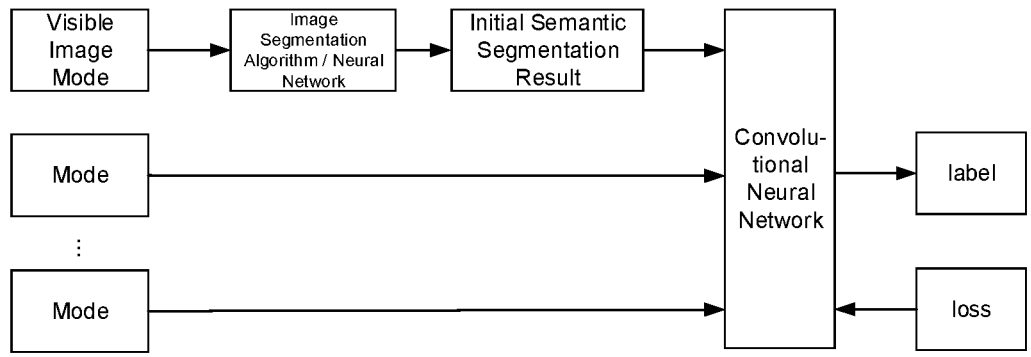
FIG. 5 is a second schematic diagram showing training of a convolutional neural network according to an embodiment of the present disclosure.

In Embodiment 3, the convolutional neural sub-networks at the respective stages can be pre-trained individually. For example, when the image information contains only the initial semantic segmentation result, the training process for the respective convolutional neural sub-networks is shown in FIG. 4. For example, when the image information contains the initial semantic segmentation result and the at least one mode, the training process for the respective convolutional neural sub-networks is shown in FIG. 5, and the modes of the training sample images for training each convolutional neural sub-network correspond to the convolutional neural sub-network. For example, when the convolutional neural network includes a convolutional neural sub-network at a first stage corresponding to a depth mode and an RGB mode and a convolutional neural sub-network at a second stage corresponding to an RGB mode and a CT mode, the training data for training the convolutional neural sub-network at the first stage includes initial semantic segmentation results of sample images, the RGB mode and the depth mode, and the training data for training the convolutional neural sub-network at the second stage includes initial semantic segmentation results of sample images, the RGB mode and the CT mode.

Figure 7:
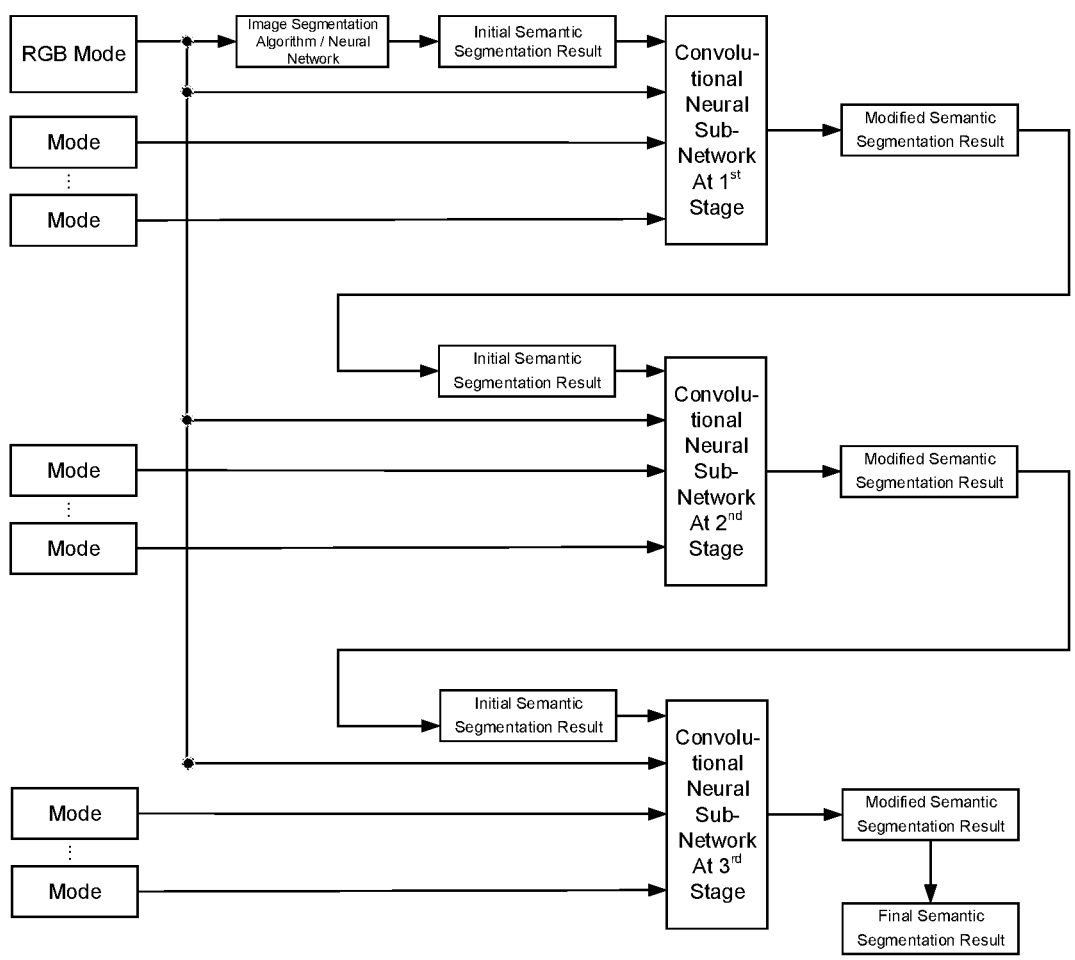
FIG. 7 is a first schematic diagram showing semantic segmentation post-processing using a convolutional neural network according to an embodiment of the present disclosure.

Preferably, as a visible image mode is the most important feature information of a pixel, the modes corresponding to the above convolutional neural sub-network at each stage can include the visible image mode. For example, when the modes corresponding to the convolutional neural sub-network at each stage include the RGB mode, a process of post-processing using at least two stages of convolutional neural sub-networks is shown in FIG. 7.

Embodiment 4

In Embodiment 4, in order to further improve the accuracy of the post-processing by the convolutional neural network, the convolutional neural network may consist of at least two stages of convolutional neural sub-networks having the same or different structures. Preferably, when the image information contains only the initial semantic segmentation result, the convolutional neural sub-networks at the respective stages may have different structures. Preferably, when the image information contains the initial semantic segmentation result and the at least one mode, the convolutional neural sub-networks at the respective stages may have the same or different structures. The present disclosure is not limited to this. The convolutional neural sub-networks at the respective stages can be configured flexibly by those skilled in the art depending on actual requirements, such that the convolutional neural sub-networks at the respective stages may have different optimization directions, thereby allowing comprehensive optimization of the initial semantic segmentation result. More preferably, when the convolutional neural sub-networks at the respective stages have the same structure, mode items corresponding to the convolutional neural sub-networks at the respective stages may be partly the same or completely different. When the convolutional neural sub-networks at the respective stages have different structures, other mode items corresponding to the convolutional neural sub-networks at the respective stages may be completely the same, partly the same or completely different.

Unlike Embodiment 3, in Embodiment 4, at least one iteration is performed at the convolutional neural sub-network at each stage before a modified semantic segmentation result obtained from the final iteration of the convolutional neural sub-network at that stage is outputted as an initial semantic segmentation result for the convolutional neural sub-network at the next stage. The convolutional neural sub-networks at the respective stages may have the same or different number of iterations. This can be configured flexibly by those skilled in the art depending on actual requirements and the present disclosure is not limited thereto.

When the image information contains only the initial semantic segmentation result, the above step 203 can be implemented using the following steps D1~D2.

At step D1, for each of the at least two stages of convolutional neural sub-networks, in a cascaded order: the initial semantic segmentation result is inputted to the convolutional neural sub-network at that stage to obtain a modified semantic segmentation result; it is determined whether an iteration condition is met; and if so, the initial semantic segmentation result for the convolutional neural sub-network at that stage is replaced with the modified semantic segmentation result and the step of inputting the image information to the convolutional neural sub-network at that stage is repeated, or otherwise it is determined to stop an iteration and the modified semantic segmentation result is used as an initial semantic segmentation result for the convolutional neural sub-network at the next stage.

At step D2, the final semantic segmentation result is determined based on the modified semantic segmentation result outputted from the convolutional neural sub-network at the last stage.

When the image information contains the initial semantic segmentation result and the at least one mode, the above step 203 can be implemented using the following steps E1~E2.

At step E1, for each of the at least two stages of convolutional neural sub-networks, in a cascaded order: the initial semantic segmentation result and a mode among the at least one mode that corresponds to the convolutional neural sub-network at that stage are inputted to the convolutional neural sub-network at that stage to obtain a modified semantic segmentation result; it is determined whether an iteration condition is met; and if so, the initial semantic segmentation result for the convolutional neural sub-network at that stage is replaced with the modified semantic segmentation result and the step of inputting the image information and the mode among the at least one mode that corresponds to the convolutional neural sub-network at that stage to the convolutional neural sub-network at that stage is repeated, or otherwise it is determined to stop an iteration and the modified semantic segmentation result is used as an initial semantic segmentation result for the convolutional neural sub-network at the next stage.

At step E2, the final semantic segmentation result is determined based on the modified semantic segmentation result outputted from the convolutional neural sub-network at the last stage.

Figure 8:
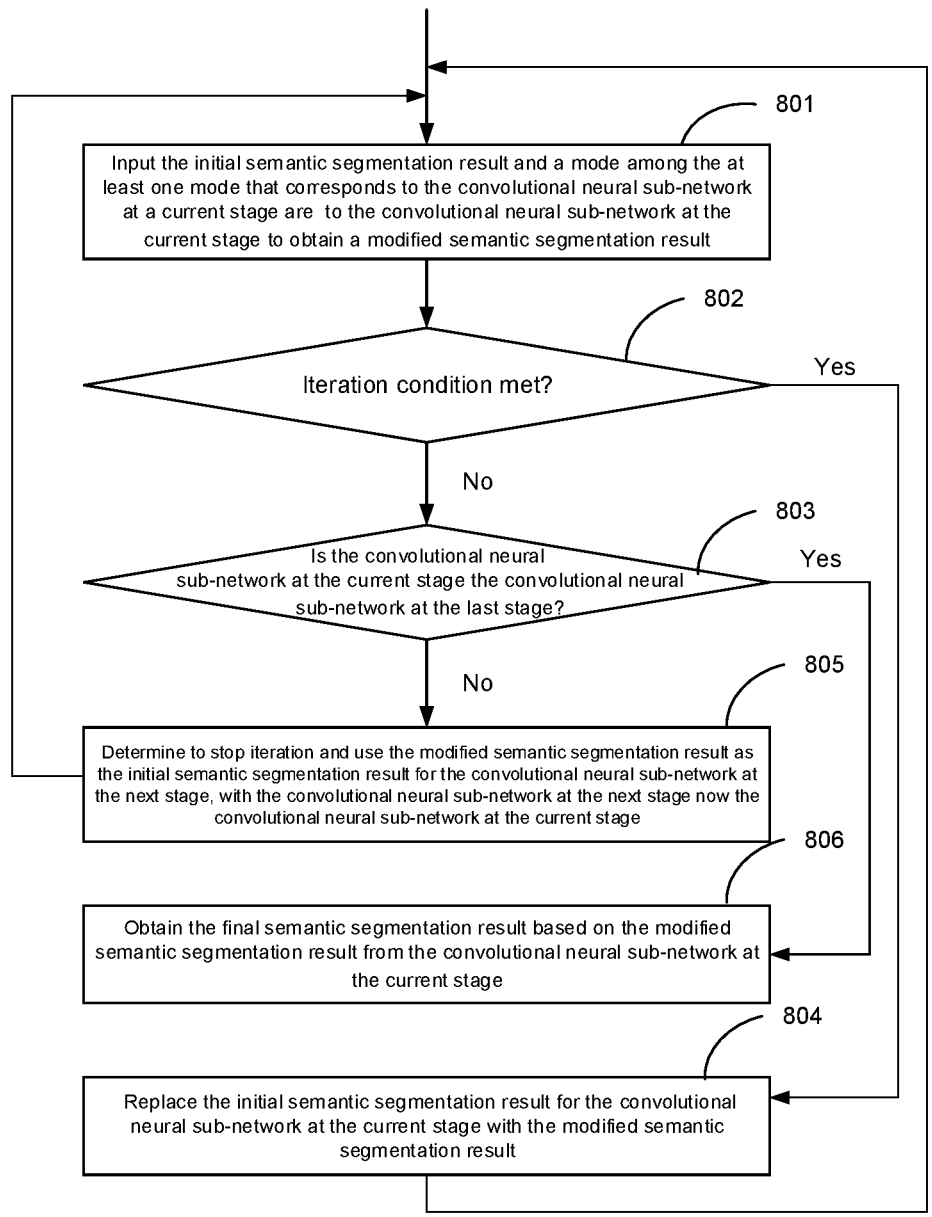
FIG. 8 is a third flowchart illustrating a method for semantic segmentation post-processing using a convolutional neural network according to an embodiment of the present disclosure.

More particular, the above steps E1~E2 can be implemented using the method process shown in FIG. 8. The method process includes the following steps.

At step 801, the initial semantic segmentation result and a mode among the at least one mode that corresponds to the convolutional neural sub-network at a current stage are inputted to the convolutional neural sub-network at the current stage to obtain a modified semantic segmentation result.

At step 802, it is determined whether an iteration condition is met. If so, the process proceeds with step 804; or otherwise the process proceeds with step 803.

In an embodiment of the present disclosure, a counter can be used to count the number of iterations for the convolutional neural sub-network at the current stage and the counter can be incremented by 1 for each iteration. The counter can be reset after the iterations of the convolutional neural sub-network at the current stage have ended.

At step 803, it is determined whether the convolutional neural sub-network at the current stage is the convolutional neural sub-network at the last stage. If so, the process proceeds with step 806; or otherwise the process proceeds with step 805.

At step 804, the initial semantic segmentation result for the convolutional neural sub-network at the current stage is replaced with the modified semantic segmentation result, and the above step 801 is repeated.

At step 805, it is determined to stop the iteration, the modified semantic segmentation result is used as the initial semantic segmentation result for the convolutional neural sub-network at the next stage, and the convolutional neural sub-network at the next stage is now the convolutional neural sub-network at the current stage. The process proceeds with the step 801.

At step 806, the final semantic segmentation result is obtained based on the modified semantic segmentation result from the convolutional neural sub-network at the current stage.

In Embodiment 4 of the present disclosure, the modified semantic segmentation result is a semantic segmentation result obtained by correcting erroneous results in the initial semantic segmentation result inputted to the convolutional neural network using the convolutional neural network. If the initial semantic segmentation result is the labels of the respective pixels in the image, the modified semantic segmentation result is labels of the respective pixels in the image. If the initial semantic segmentation result is the confidence map, the modified semantic segmentation result is a confidence map.

In Embodiment 4 of the present disclosure, when the modified semantic segmentation result is also a confidence map, in the above step D2 or E2, for each pixel in the image, a maximum value of the probability that the pixel belongs to each category label can be determined based on the modified semantic segmentation result obtained from the final iteration of the convolutional neural sub-network at the last stage and the category label having the largest probability value can be determined as the final category label to which the pixel belongs.

In the embodiment of the present disclosure, when the modified semantic segmentation result is labels of the respective pixels in the image, in the above step D2 or E2, the modified semantic segmentation result obtained from the final iteration of the convolutional neural sub-network at the last stage can be determined as the final semantic segmentation result.

In Embodiment 4 of the present disclosure, the iteration condition may include an accumulated number of iterations having reached a predetermined number threshold, or a modified semantic segmentation result currently outputted from the convolutional neural sub-network at a current stage and a semantic segmentation result previously outputted from the convolutional neural sub-network at the current stage satisfying a convergence condition. The present disclosure is not limited to any specific iteration condition. The above step D1 or E1 of determining whether the iteration condition is met can be, but not limited to be, implemented in any of the following two schemes.

Scheme 1: It can be determined whether an accumulated number of iterations has reached a predetermined number threshold, and if so, it is determined that the iteration condition is not met, or otherwise it is determined that the iteration condition is met. For example, a counter can be used to count the number of iterations and the counter can be incremented by 1 for each iteration. The counter can be reset when the iterations of the convolutional neural sub-network at the current stage have ended.

Scheme 2: It can be determined whether a modified semantic segmentation result currently outputted from the convolutional neural sub-network at the current stage and a semantic segmentation result previously outputted from the convolutional neural sub-network at the current stage satisfy a convergence condition, and if so, it is determined that the iteration condition is not met, or otherwise it is determined that the iteration condition is met.

In Embodiment 4, the convolutional neural sub-networks at the respective stages can be pre-trained individually. For example, when the image information contains only the initial semantic segmentation result, the training process for the respective convolutional neural sub-networks is shown in FIG. 4. For example, when the image information contains the initial semantic segmentation result and the at least one mode, the training process for the respective convolutional neural sub-networks is shown in FIG. 5, and the modes of the training sample images for training each convolutional neural sub-network correspond to the convolutional neural sub-network. For example, when the convolutional neural network includes a convolutional neural sub-network at a first stage corresponding to a depth mode and an RGB mode and a convolutional neural sub-network at a second stage corresponding to an RGB mode and a CT mode, the training data for training the convolutional neural sub-network at the first stage includes initial semantic segmentation results of sample images, the RGB mode and the depth mode, and the training data for training the convolutional neural sub-network at the second stage includes initial semantic segmentation results of sample images, the RGB mode and the CT mode.

Figure 9:
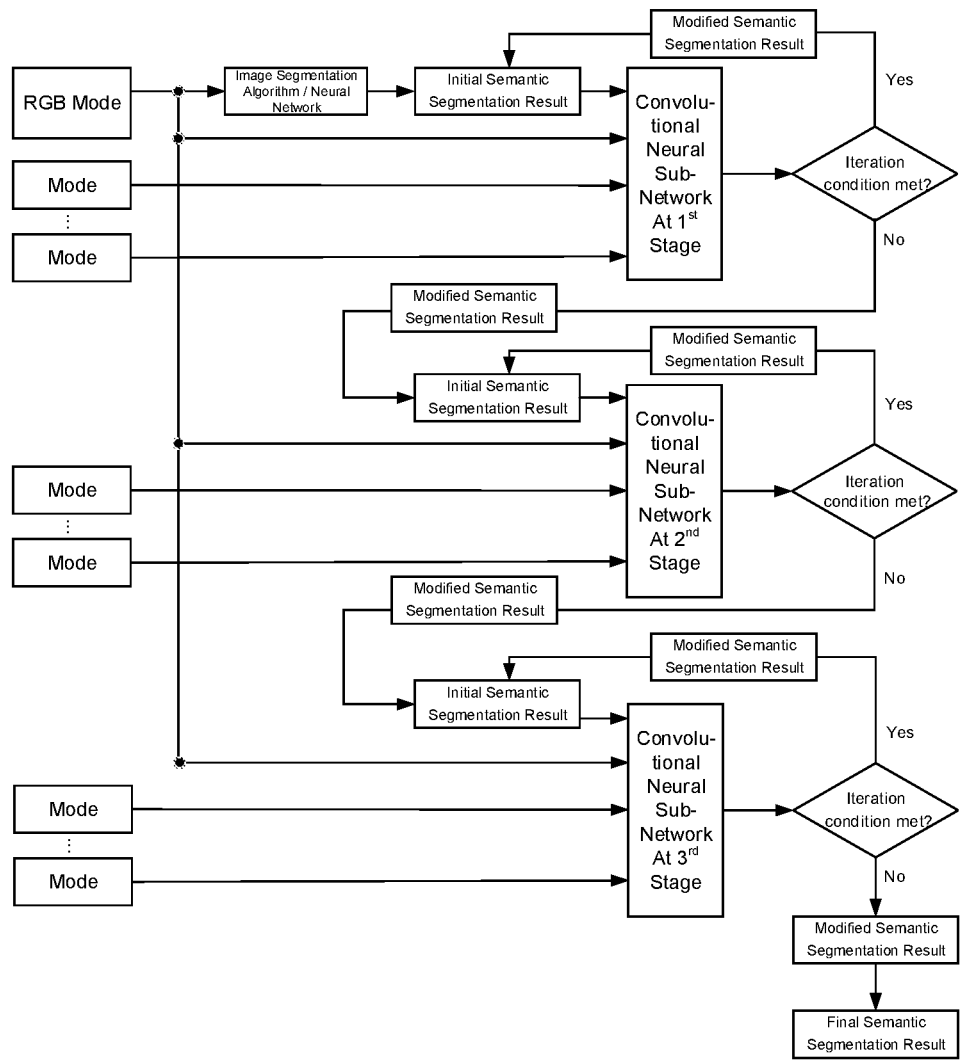
FIG. 9 is a second schematic diagram showing semantic segmentation post-processing using a convolutional neural network according to an embodiment of the present disclosure.

Preferably, as a visible image mode is the most important feature information of a pixel, the modes corresponding to the above convolutional neural sub-network at each stage can include the visible image mode. For example, when the modes corresponding to the convolutional neural sub-network at each stage include the RGB mode, a process of post-processing using at least two stages of convolutional neural sub-networks is shown in FIG. 9.

Preferably, in Embodiment 3 and Embodiment 4 of the present disclosure, the above convolutional neural network may consist of two stages of convolutional neural sub-networks, including a first stage of convolutional neural sub-network which is a convolutional neural network for global information optimization post-processing, and a second stage of convolutional neural sub-network which is a convolutional neural network for local edge optimization post-processing.

Figure 10:
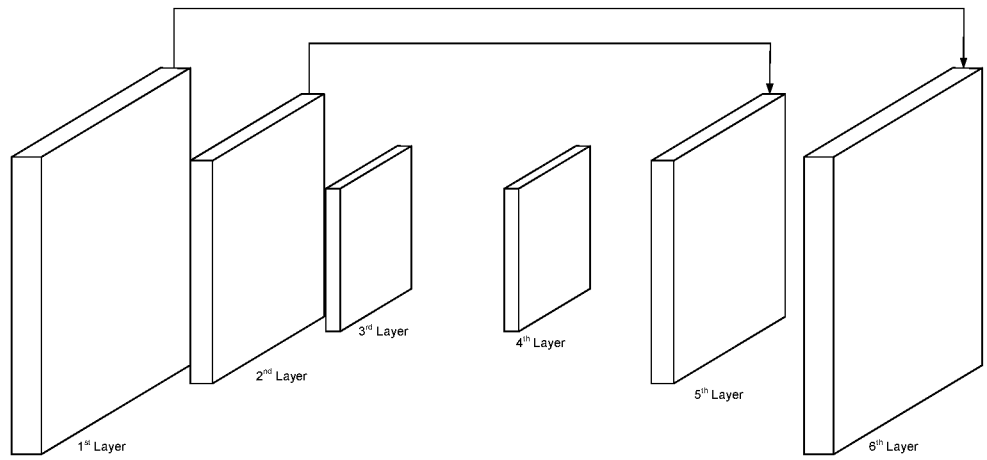
FIG. 10 is a schematic diagram showing a structure of a convolutional neural network for global information optimization post-processing according to an embodiment of the present disclosure.
Figure 11:
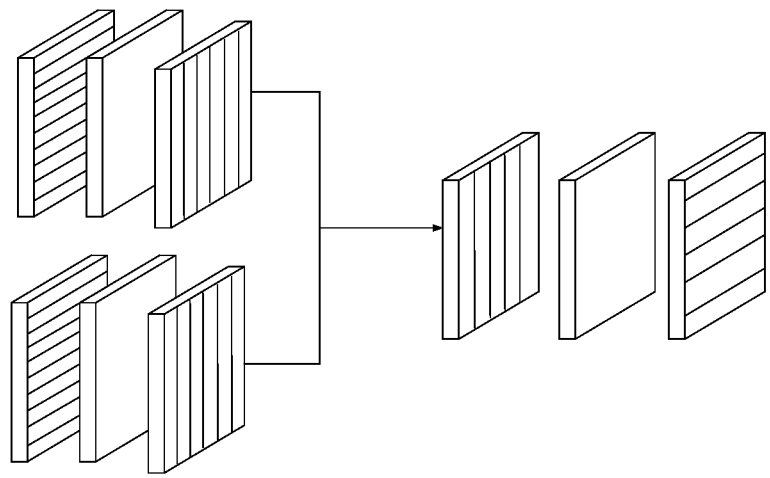
FIG. 11 is a schematic diagram showing a structure of a convolutional neural network for local edge optimization post-processing according to an embodiment of the present disclosure.

A structure of the convolutional neural network for global information optimization post-processing is shown in FIG. 10. Global information is obtained by fast down-sampling and erroneous results are corrected by up-sampling based on the global information and low-level information. A structure of the convolutional neural network for local edge optimization post-processing is shown in FIG. 11.

Figure 12:
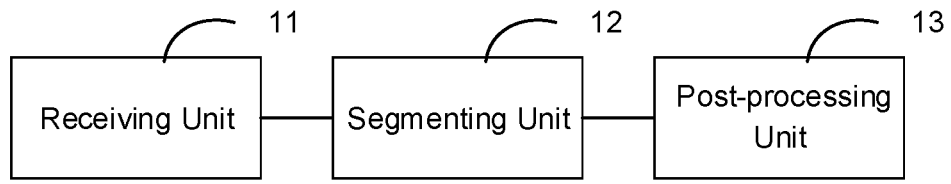
FIG. 12 is a schematic diagram showing a structure of an apparatus for semantic segmentation of an image according to an embodiment of the present disclosure.

Based on the same concept as the above method for semantic segmentation of an image, an apparatus for semantic segmentation of an image is provided according to an embodiment of the present disclosure. As shown in FIG. 12, a structure of the apparatus includes: a receiving unit 11 configured to receive the image; a segmenting unit 12 configured to perform semantic segmentation on the image to obtain an initial semantic segmentation result; and a post-processing unit 13 configured to input image information containing the initial semantic segmentation result to a pre-trained convolutional neural network for semantic segmentation post-processing, so as to obtain a final semantic segmentation result.

The image information can contain the initial semantic segmentation result only, or the initial semantic segmentation result and at least one mode corresponding to the image and describing feature information of the image.

Figure 13:
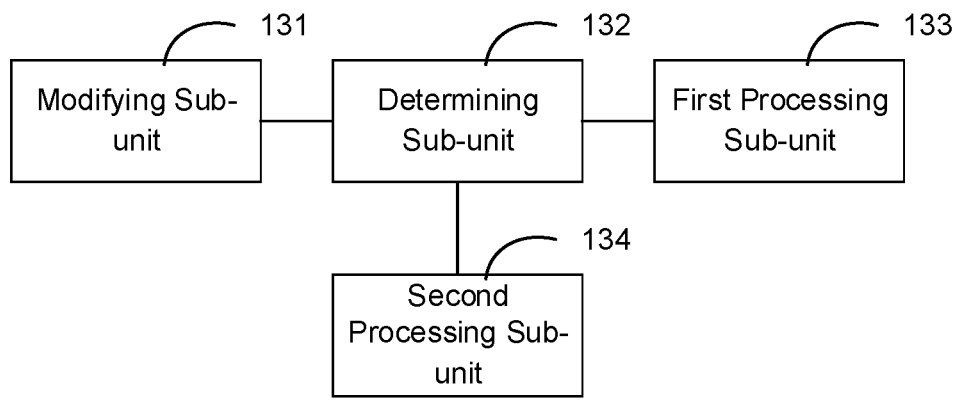
FIG. 13 is a schematic diagram showing a structure of a post-processing unit according to an embodiment of the present disclosure.

In an example, the post-processing unit 13 can have a structure shown in FIG. 13 and include: a modifying sub-unit 131 configured to input the image information to the convolutional neural network to obtain a modified semantic segmentation result; a determining sub-unit 132 configured to determine whether an iteration condition is met, and if so, trigger a first processing sub-unit 133, or otherwise trigger a second processing sub-unit 134; the first processing sub-unit 133 configured to replace the initial semantic segmentation result in the image information with the modified semantic segmentation result and trigger the modifying sub-unit 131; and the second processing sub-unit 134 configured to determine to stop an iteration and obtain the final semantic segmentation result based on the modified semantic segmentation result.

Preferably, the determining sub-unit 132 can be configured to: determine whether an accumulated number of iterations has reached a predetermined number threshold, and if so, determine that the iteration condition is not met, or otherwise determine that the iteration condition is met, or determine whether a modified semantic segmentation result currently outputted from the convolutional neural network and a semantic segmentation result previously outputted from the convolutional neural network satisfy a convergence condition, and if so, determine that the iteration condition is not met, or otherwise determine that the iteration condition is met.

In another example, the convolutional neural network can consist of at least two stages of convolutional neural sub-networks, and the post-processing unit 93 can have a structure including a third processing sub-unit and a fourth processing sub-unit. The third processing sub-unit is configured to, for each of the at least two stages of convolutional neural sub-networks, in a cascaded order: input the initial semantic segmentation result to the convolutional neural sub-network at that stage to obtain a modified semantic segmentation result; and use the modified semantic segmentation result as an initial semantic segmentation result for the convolutional neural sub-network at the next stage. The fourth processing sub-unit is configured to determine the final semantic segmentation result based on the modified semantic segmentation result outputted from the convolutional neural sub-network at the last stage.

In another example, the convolutional neural network can consist of at least two stages of convolutional neural sub-networks, and the post-processing unit 93 can have a structure including a fifth processing sub-unit and a sixth processing sub-unit. The fifth processing sub-unit is configured to, for each of the at least two stages of convolutional neural sub-networks, in a cascaded order: input the initial semantic segmentation result to the convolutional neural sub-network at that stage to obtain a modified semantic segmentation result; determine whether an iteration condition is met; and if so, replace the initial semantic segmentation result for the convolutional neural sub-network at that stage with the modified semantic segmentation result and repeat the step of inputting the image information to the convolutional neural sub-network at that stage, or otherwise determine to stop an iteration and use the modified semantic segmentation result as an initial semantic segmentation result for the convolutional neural sub-network at the next stage. The sixth processing sub-unit is configured to determine the final semantic segmentation result based on the modified semantic segmentation result outputted from the convolutional neural sub-network at the last stage.

In another example, the convolutional neural network can consist of at least two stages of convolutional neural sub-networks, and the post-processing unit 93 can have a structure including a seventh processing sub-unit and an eighth processing sub-unit. The seventh processing sub-unit is configured to, for each of the at least two stages of convolutional neural sub-networks, in a cascaded order: input the initial semantic segmentation result and a mode among the at least one mode that corresponds to the convolutional neural sub-network at that stage to the convolutional neural sub-network at that stage to obtain a modified semantic segmentation result; and use the modified semantic segmentation result as an initial semantic segmentation result for the convolutional neural sub-network at the next stage. The eighth processing sub-unit is configured to determine the final semantic segmentation result based on the modified semantic segmentation result outputted from the convolutional neural sub-network at the last stage.

In a final example, the convolutional neural network can consist of at least two stages of convolutional neural sub-networks, and the post-processing unit 93 can have a structure including a ninth processing sub-unit and a tenth processing sub-unit. The ninth processing sub-unit is configured to, for each of the at least two stages of convolutional neural sub-networks, in a cascaded order: input the initial semantic segmentation result and a mode among the at least one mode that corresponds to the convolutional neural sub-network at that stage to the convolutional neural sub-network at that stage to obtain a modified semantic segmentation result; determine whether an iteration condition is met; and if so, replace the initial semantic segmentation result for the convolutional neural sub-network at that stage with the modified semantic segmentation result and repeat the step of inputting the image information and the mode among the at least one mode that corresponds to the convolutional neural sub-network at that stage to the convolutional neural sub-network at that stage, or otherwise determine to stop an iteration and use the modified semantic segmentation result as an initial semantic segmentation result for the convolutional neural sub-network at the next stage. The tenth processing sub-unit is configured to determine the final semantic segmentation result based on the modified semantic segmentation result outputted from the convolutional neural sub-network at the last stage.

Preferably, the convolutional neural network may consist of two stages of convolutional neural sub-networks, including a first stage of convolutional neural sub-network which is a convolutional neural network for global information optimization post-processing, and a second stage of convolutional neural sub-network which is a convolutional neural network for local edge optimization post-processing.

Preferably, the semantic segmentation result can be a confidence map or labels to which respective pixels in the image belong.

Preferably, the at least one mode corresponding to the image can include one or more of: a visible image mode (e.g., an RGB mode or an HSV mode), a depth mode, a Computed Tomography (CT) mode, an infrared mode, a millimeter wave mode or an ultrasound mode.

With the image segmentation schemes according to the present disclosure, on one hand, as the convolutional neural network is pre-trained, it can post-process the image information containing the initial semantic segmentation result quickly, without calculating correlations between respective pixels in the image as required in the CRF scheme in the related art, such that the speed and efficiency of the post-processing can be improved. On the other hand, in addition to the initial semantic segmentation result, the data inputted to the convolutional neural network can also include at least one mode (e.g., a depth mode or an RGB mode) describing feature information of respective pixels in the image. In practice, pixels belonging to the same category label generally have the same feature information. Thus, with the mode of the image, the correction of erroneous results in the initial semantic segmentation result can be more accurate.

Accordingly, when the image information includes the at least one mode, the accuracy of the semantic segmentation result can be further improved.

Figure 14:
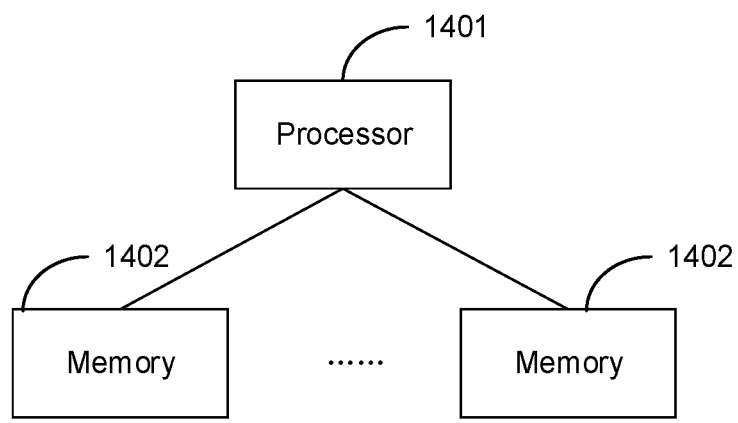
FIG. 14 is another schematic diagram showing a structure of an apparatus for semantic segmentation of an image according to an embodiment of the present disclosure.

Based on the same concept, an apparatus for semantic segmentation of an image is provided according to the present disclosure. The apparatus has a structure shown in FIG. 14 and includes a processor 1401 and at least one memory 1402 storing at least one machine executable instruction. The processor 1401 is operative to execute the at least one machine executable instruction to: receive the image; perform semantic segmentation on the image to obtain an initial semantic segmentation result; and input image information containing the initial semantic segmentation result to a pre-trained convolutional neural network for semantic segmentation post-processing, so as to obtain a final semantic segmentation result.

In an embodiment, the image information can further contain at least one mode corresponding to the image and describing feature information of the image.

In an embodiment, the processor 1401 being operative to execute the at least one machine executable instruction to input the image information containing the initial semantic segmentation result to the pre-trained convolutional neural network for semantic segmentation post-processing so as to obtain the final semantic segmentation result can include the processor 1401 being operative to execute the at least one machine executable instruction to: input the image information to the convolutional neural network to obtain a modified semantic segmentation result; determine whether an iteration condition is met; and if so, replace the initial semantic segmentation result in the image information with the modified semantic segmentation result and repeat the step of inputting the image information to the convolutional neural network, or otherwise determine to stop an iteration and obtain the final semantic segmentation result based on the modified semantic segmentation result.

In an embodiment, the convolutional neural network can consist of at least two stages of convolutional neural sub-networks, and the processor 1401 being operative to execute the at least one machine executable instruction to input the image information containing the initial semantic segmentation result to the pre-trained convolutional neural network for semantic segmentation post-processing so as to obtain the final semantic segmentation result can include the processor 1401 being operative to execute the at least one machine executable instruction to: for each of the at least two stages of convolutional neural sub-networks, in a cascaded order: input the initial semantic segmentation result to the convolutional neural sub-network at that stage to obtain a modified semantic segmentation result; and use the modified semantic segmentation result as an initial semantic segmentation result for the convolutional neural sub-network at the next stage; and determine the final semantic segmentation result based on the modified semantic segmentation result outputted from the convolutional neural sub-network at the last stage.

In an embodiment, the convolutional neural network can consist of at least two stages of convolutional neural sub-networks, and the processor 1401 being operative to execute the at least one machine executable instruction to input the image information containing the initial semantic segmentation result to the pre-trained convolutional neural network for semantic segmentation post-processing so as to obtain the final semantic segmentation result can include the processor 1401 being operative to execute the at least one machine executable instruction to: for each of the at least two stages of convolutional neural sub-networks, in a cascaded order: input the initial semantic segmentation result to the convolutional neural sub-network at that stage to obtain a modified semantic segmentation result; determine whether an iteration condition is met; and if so, replace the initial semantic segmentation result for the convolutional neural sub-network at that stage with the modified semantic segmentation result and repeat the step of inputting the image information to the convolutional neural sub-network at that stage, or otherwise determine to stop an iteration and use the modified semantic segmentation result as an initial semantic segmentation result for the convolutional neural sub-network at the next stage; and determine the final semantic segmentation result based on the modified semantic segmentation result outputted from the convolutional neural sub-network at the last stage.

In an embodiment, the convolutional neural network can consist of at least two stages of convolutional neural sub-networks, and the processor 1401 being operative to execute the at least one machine executable instruction to input the image information containing the initial semantic segmentation result to the pre-trained convolutional neural network for semantic segmentation post-processing so as to obtain the final semantic segmentation result can include the processor 1401 being operative to execute the at least one machine executable instruction to: for each of the at least two stages of convolutional neural sub-networks, in a cascaded order: input the initial semantic segmentation result and a mode among the at least one mode that corresponds to the convolutional neural sub-network at that stage to the convolutional neural sub-network at that stage to obtain a modified semantic segmentation result; and use the modified semantic segmentation result as an initial semantic segmentation result for the convolutional neural sub-network at the next stage; and determine the final semantic segmentation result based on the modified semantic segmentation result outputted from the convolutional neural sub-network at the last stage.

In an embodiment, the convolutional neural network can consist of at least two stages of convolutional neural sub-networks, and the processor 1401 being operative to execute the at least one machine executable instruction to input the image information containing the initial semantic segmentation result to the pre-trained convolutional neural network for semantic segmentation post-processing so as to obtain the final semantic segmentation result can include the processor 1401 being operative to execute the at least one machine executable instruction to: for each of the at least two stages of convolutional neural sub-networks, in a cascaded order: input the initial semantic segmentation result and a mode among the at least one mode that corresponds to the convolutional neural sub-network at that stage to the convolutional neural sub-network at that stage to obtain a modified semantic segmentation result; determine whether an iteration condition is met; and if so, replace the initial semantic segmentation result for the convolutional neural sub-network at that stage with the modified semantic segmentation result and repeat the step of inputting the image information and the mode among the at least one mode that corresponds to the convolutional neural sub-network at that stage to the convolutional neural sub-network at that stage, or otherwise determine to stop an iteration and using the modified semantic segmentation result as an initial semantic segmentation result for the convolutional neural sub-network at the next stage; and determine the final semantic segmentation result based on the modified semantic segmentation result outputted from the convolutional neural sub-network at the last stage.

In an embodiment, the convolutional neural network can consist of two stages of convolutional neural sub-networks, including a first stage of convolutional neural sub-network which is a convolutional neural network for global information optimization post-processing, and a second stage of convolutional neural sub-network which is a convolutional neural network for local edge optimization post-processing.

In an embodiment, the processor 1401 being operative to execute the at least one machine executable instruction to determine whether the iteration condition is met can include the processor 1401 being operative to execute the at least one machine executable instruction to: determine whether an accumulated number of iterations has reached a predetermined number threshold, and if so, determine that the iteration condition is not met, or otherwise determine that the iteration condition is met, or determine whether a modified semantic segmentation result currently outputted from the convolutional neural sub-network at the stage and a semantic segmentation result previously outputted from the convolutional neural sub-network at the stage satisfy a convergence condition, and if so, determine that the iteration condition is not met, or otherwise determine that the iteration condition is met.

In an embodiment, the semantic segmentation result can be a confidence map or category labels to which respective pixels in the image belong.

In an embodiment, the at least one mode corresponding to the image can include one or more of: a visible image mode, a depth mode, a Computed Tomography (CT) mode, an infrared mode, a millimeter wave mode or an ultrasound mode.

Based on the same concept as the above method, a storage medium (which can be a non-volatile machine readable storage medium) is provided according to an embodiment of the present disclosure. The storage medium stores a computer program for semantic segmentation of an image. The computer program includes codes configured to: receive the image; perform semantic segmentation on the image to obtain an initial semantic segmentation result; and input image information containing the initial semantic segmentation result to a pre-trained convolutional neural network for semantic segmentation post-processing, so as to obtain a final semantic segmentation result.

Based on the same concept as the above method, a computer program is provided according to an embodiment of the present disclosure. The computer program includes codes for semantic segmentation of an image, the codes being configured to: receive the image; perform semantic segmentation on the image to obtain an initial semantic segmentation result; and input image information containing the initial semantic segmentation result to a pre-trained convolutional neural network for semantic segmentation post-processing, so as to obtain a final semantic segmentation result.

To summarize, with the solutions according to the present disclosure, after an initial semantic segmentation result is obtained by performing semantic segmentation on a received image, image information containing the initial semantic segmentation result can be inputted to a convolutional neural network for semantic segmentation post-processing, so as to obtain a final semantic segmentation result. With the image segmentation schemes according to the present disclosure, as the convolutional neural network is pre-trained, it can post-process the image information containing the initial semantic segmentation result quickly, without calculating correlations between respective pixels in the image as required in the CRF scheme in the related art, such that the speed and efficiency of the post-processing can be improved. The other features and advantages of the present disclosure will be explained in the following description, and will become apparent partly from the description or be understood by implementing the present disclosure. The objects and other advantages of the present disclosure can be achieved and obtained from the structures specifically illustrated in the written description, claims and figures.

The basic principles of the present disclosure have been described above with reference to the embodiments. However, it can be appreciated by those skilled in the art that all or any of the steps or components of the method or apparatus according to the present disclosure can be implemented in hardware, firmware, software or any combination thereof in any computing device (including a processor, a storage medium, etc.) or a network of computing devices. This can be achieved by those skilled in the art using their basic programing skills based on the description of the present disclosure.

It can be appreciated by those skilled in the art that all or part of the steps in the method according to the above embodiment can be implemented in hardware following instructions of a program. The program can be stored in a computer readable storage medium. The program, when executed, may include one or any combination of the steps in the method according to the above embodiment.

Further, the functional units in the embodiments of the present disclosure can be integrated into one processing module or can be physically separate, or two or more units can be integrated into one module. Such integrated module can be implemented in hardware or software functional units. When implemented in software functional units and sold or used as a standalone product, the integrated module can be stored in a computer readable storage medium.

It can be appreciated by those skilled in the art that the embodiments of the present disclosure can be implemented as a method, a system or a computer program product. The present disclosure may include pure hardware embodiments, pure software embodiments and any combination thereof. Also, the present disclosure may include a computer program product implemented on one or more computer readable storage mediums (including, but not limited to, magnetic disk storage and optical storage) containing computer readable program codes.

The present disclosure has been described with reference to the flowcharts and/or block diagrams of the method, device (system) and computer program product according to the embodiments of the present disclosure. It can be appreciated that each process and/or block in the flowcharts and/or block diagrams, or any combination thereof, can be implemented by computer program instructions. Such computer program instructions can be provided to a general computer, a dedicated computer, an embedded processor or a processor of any other programmable data processing device to constitute a machine, such that the instructions executed by a processor of a computer or any other programmable data processing device can constitute means for implementing the functions specified by one or more processes in the flowcharts and/or one or more blocks in the block diagrams.

These computer program instructions can also be stored in a computer readable memory that can direct a computer or any other programmable data processing device to operate in a particular way. Thus, the instructions stored in the computer readable memory constitute a manufacture including instruction means for implementing the functions specified by one or more processes in the flowcharts and/or one or more blocks in the block diagrams.

These computer program instructions can also be loaded onto a computer or any other programmable data processing device, such that the computer or the programmable data processing device can perform a series of operations/steps to achieve a computer-implemented process. In this way, the instructions executed on the computer or the programmable data processing device can provide steps for implementing the functions specified by one or more processes in the flowcharts and/or one or more blocks in the block diagrams.

While the embodiments of the present disclosure have described above, further alternatives and modifications can be made to these embodiments by those skilled in the art in light of the basic inventive concept of the present disclosure. The claims as attached are intended to cover the above embodiments and all these alternatives and modifications that fall within the scope of the present disclosure.

Obviously, various modifications and variants can be made to the present disclosure by those skilled in the art without departing from the spirit and scope of the present disclosure. Therefore, these modifications and variants are to be encompassed by the present disclosure if they fall within the scope of the present disclosure as defined by the claims and their equivalents.

What is claimed is:

1. A method for semantic segmentation of an image, comprising:
   receiving the image;
   performing semantic segmentation on the image to obtain an initial semantic segmentation result; and
   inputting image information containing the initial semantic segmentation result to a pre-trained convolutional neural network for semantic segmentation post-processing, so as to obtain a final semantic segmentation result,
   wherein said inputting the image information containing the initial semantic segmentation result to the pre-trained convolutional neural network for semantic segmentation post-processing so as to obtain the final semantic segmentation result comprises:
   inputting the image information to the convolutional neural network to obtain a modified semantic segmentation result;
   determining whether an iteration condition is met; and
   if so, replacing the initial semantic segmentation result in the image information with the modified semantic segmentation result and repeating the step of inputting the image information to the convolutional neural network, or
   otherwise determining to stop an iteration and obtaining the final semantic segmentation result based on the modified semantic segmentation result.

2. The method of claim 1, wherein the image information further contains at least one mode corresponding to the image and describing feature information of the image.

3. A method for semantic segmentation of an image, comprising:
   receiving the image;
   performing semantic segmentation on the image to obtain an initial semantic segmentation result; and
   inputting image information containing the initial semantic segmentation result to a pre-trained convolutional neural network for semantic segmentation post-processing, so as to obtain a final semantic segmentation result, wherein the convolutional neural network consists of at least two stages of convolutional neural sub-networks, and said inputting the image information containing the initial semantic segmentation result to the pre-trained convolutional neural network for semantic segmentation post-processing so as to obtain the final semantic segmentation result comprises:

for each of the at least two stages of convolutional neural sub-networks, in a cascaded order:

inputting the initial semantic segmentation result to the convolutional neural sub-network at that stage to obtain a modified semantic segmentation result; and using the modified semantic segmentation result as an initial semantic segmentation result for the convolutional neural sub-network at the next stage; and determining the final semantic segmentation result based on the modified semantic segmentation result outputted from the convolutional neural sub-network at the last stage.

4. The method of claim 3, wherein said inputting the image information containing the initial semantic segmentation result to the pre-trained convolutional neural network for semantic segmentation post-processing so as to obtain the final semantic segmentation result comprises:

for each of the at least two stages of convolutional neural sub-networks, in a cascaded order:

determining whether an iteration condition is met; and if so, replacing the initial semantic segmentation result for the convolutional neural sub-network at that stage with the modified semantic segmentation result; and repeating the step of inputting the image information to the convolutional neural sub-network at that stage, or otherwise determining to stop an iteration;

wherein said using the modified semantic segmentation result as the initial semantic segmentation result for the convolutional neural sub-network at the next stage comprises:

in response to determining to stop the iteration, using the modified semantic segmentation result as the initial semantic segmentation result for the convolutional neural sub-network at the next stage.

5. The method of claim 3, wherein the image information further contains at least one mode corresponding to the image and describing feature information of the image and inputting the initial semantic segmentation result to the convolutional neural sub-network at that stage to obtain the modified semantic segmentation result comprises:

inputting the initial semantic segmentation result; and a mode among the at least one mode that corresponds to the convolutional neural sub-network at that stage to the convolutional neural sub-network at that stage to obtain the modified semantic segmentation result.

6. The method of claim 5, wherein said inputting the image information containing the initial semantic segmentation result to the pre-trained convolutional neural network for semantic segmentation post-processing so as to obtain the final semantic segmentation result further comprises:

for each of the at least two stages of convolutional neural sub-networks, in a cascaded order:

determining whether an iteration condition is met; and if so, replacing the initial semantic segmentation result for the convolutional neural sub-network at that stage with the modified semantic segmentation result; and repeating the step of inputting the image information and the mode among the at least one mode that corresponds to the convolutional neural sub-network at that stage to the convolutional neural sub-network at that stage, or otherwise determining to stop an iteration;

wherein said using the modified semantic segmentation results in the initial semantic segmentation result for the convolution neural sub-network at the next stage comprises:

in response to determining to stop the iteration, using the modified semantic segmentation result as the initial semantic segmentation result for the convolutional neural sub-network at the next stage.

7. The method of claim 1, wherein the convolutional neural network consists of two stages of convolutional neural sub-networks, comprising a first stage of convolutional neural sub-network which is a convolutional neural network for global information optimization post-processing, and a second stage of convolutional neural sub-network which is a convolutional neural network for local edge optimization post-processing.

8. The method of claim 6, wherein said determining whether the iteration condition is met comprises:

determining whether an accumulated number of iterations has reached a predetermined number threshold, and if so, determining that the iteration condition is not met, or otherwise determining that the iteration condition is met, or determining whether a modified semantic segmentation result currently outputted from the convolutional neural sub-network at the stage and a semantic segmentation result previously outputted from the convolutional neural sub-network at the stage satisfy a convergence condition, and if so, determining that the iteration condition is not met, or otherwise determining that the iteration condition is met.

9. The method of claim 1, wherein the semantic segmentation result is a confidence map or category labels to which respective pixels in the image belong.

10. The method of claim 2, wherein the at least one mode corresponding to the image comprises one or more of: a visible image mode, a depth mode, a Computed Tomography (CT) mode, an infrared mode, a millimeter wave mode or an ultrasound mode.

11. An apparatus for semantic segmentation of an image, comprising a processor and at least one memory storing at least one machine executable instruction, the processor being operative to execute the at least one machine executable instruction to:

receive the image;

perform semantic segmentation on the image to obtain an initial semantic segmentation result; and input image information containing the initial semantic segmentation result to a pre-trained convolutional neural network for semantic segmentation post-processing, so as to obtain a final semantic segmentation result;

wherein the image information further contains at least one mode corresponding to the image and describing feature information of the image, and further wherein the processor being operative to execute the at least one machine executable instruction to input the image information containing the initial semantic segmentation result to the pre-trained convolutional neural network for semantic segmentation post-processing so as to obtain the final semantic segmentation result comprises the processor being operative to execute the at least one machine executable instruction to:

input the image information to the convolutional neural network to obtain a modified semantic segmentation result;

determine whether an iteration condition is met; and if so, replace the initial semantic segmentation result in the image information with the modified semantic segmentation result and repeat the step of inputting the image information to the convolutional neural network, or otherwise determine to stop an iteration and obtain the final semantic segmentation result based on the modified semantic segmentation result.

12. An apparatus for semantic segmentation of an image, comprising a processor and at least one memory storing at least one machine executable instruction, the processor being operative to execute the at least one machine executable instruction to:
receive the image;
perform semantic segmentation on the image to obtain an initial semantic segmentation result; and
input image information containing the initial semantic segmentation result to a pre-trained convolutional neural network for semantic segmentation post-processing, so as to obtain a final semantic segmentation result;
wherein the convolutional neural network consists of at least two stages of convolutional neural sub-networks, and the processor being operative to execute the at least one machine executable instruction to input the image information containing the initial semantic segmentation result to the pre-trained convolutional neural network for semantic segmentation post-processing so as to obtain the final semantic segmentation result comprises the processor being operative to execute the at least one machine executable instruction to:
for each of the at least two stages of convolutional neural sub-networks, in a cascaded order:
input the initial semantic segmentation result to the convolutional neural sub-network at that stage to obtain a modified semantic segmentation result; and
use the modified semantic segmentation result as an initial semantic segmentation result for the convolutional neural sub-network at the next stage; and
determine the final semantic segmentation result based on the modified semantic segmentation result outputted from the convolutional neural sub-network at the last stage.

13. The apparatus of claim 12, wherein the processor being operative to execute the at least one machine executable instruction to input the image information containing the initial semantic segmentation result to the pre-trained convolutional neural network for semantic segmentation post-processing so as to obtain the final semantic segmentation result further comprises the processor being operative to execute the at least one machine executable instruction to:
for each of the at least two stages of convolutional neural sub-networks, in a cascaded order:
determine whether an iteration condition is met; and
if so, replace the initial semantic segmentation result for the convolutional neural sub-network at that stage with the modified semantic segmentation result and repeat the step of inputting the image information to the convolutional neural sub-network at that stage, or
otherwise determine to stop an iteration;
the processor being operative to use the modified semantic segmentation result as the initial semantic segmentation result for the convolution neural sub-network at the next stare comprises the processor being operative to execute the at least one machine executable instruction to:
in response to determining to stop the iteration, use the modified semantic segmentation result as the initial semantic segmentation result for the convolutional neural sub-network at the next stage.

14. The apparatus of claim 12, wherein the image information further contains at least one mode corresponding to the image and describing feature information of the image, and the processor being operative to input the initial semantic segmentation result to the convolution neural sub-network at that stage to obtain the modified semantic segmentation result comprises the processor being operative to execute the at least one machine executable instruction to:
input the initial semantic segmentation result; and a mode among the at least one mode that corresponds to the convolutional neural sub-network at that stage to the convolutional neural sub-network at that stage to obtain the modified semantic segmentation result.

15. The apparatus of claim 14, wherein the processor being operative to execute the at least one machine executable instruction to input the image information containing the initial semantic segmentation result to the pre-trained convolutional neural network for semantic segmentation post-processing so as to obtain the final semantic segmentation result further comprises the processor being operative to execute the at least one machine executable instruction to:
for each of the at least two stages of convolutional neural sub-networks, in a cascaded order:
determine whether an iteration condition is met; and
if so, replace the initial semantic segmentation result for the convolutional neural sub-network at that stage with the modified semantic segmentation result and repeat the step of inputting the image information and the mode among the at least one mode that corresponds to the convolutional neural sub-network at that stage to the convolutional neural sub-network at that stage, or
otherwise determine to stop an iteration;
the processor being operative to use the modified semantic segmentation result as the initial semantic segmentation result for the convolution neural sub-network at the next stage comprises the processor being operative to execute the at least one machine executable instruction to:
in response to determining to stop the iteration, using the modified semantic segmentation result as the initial semantic segmentation result for the convolutional neural sub-network at the next stage.

16. The apparatus of claim 11, wherein the convolutional neural network consists of two stages of convolutional neural sub-networks, comprising a first stage of convolutional neural sub-network which is a convolutional neural network for global information optimization post-processing, and a second stage of convolutional neural sub-network which is a convolutional neural network for local edge optimization post-processing.

17. The apparatus of claim 15, wherein the processor being operative to execute the at least one machine executable instruction to determine whether the iteration condition is met comprises the processor being operative to execute the at least one machine executable instruction to:
determine whether an accumulated number of iterations has reached a predetermined number threshold, and if so, determine that the iteration condition is not met, or otherwise determine that the iteration condition is met, or
determine whether a modified semantic segmentation result currently outputted from the convolutional neural sub-network at the stage and a semantic segmentation result previously outputted from the convolutional neural sub-network at the stage satisfy a convergence condition, and if so, determine that the iteration condition is not met, or otherwise determine that the iteration condition is met.

18. The apparatus of claim 11, wherein the semantic segmentation result is a confidence map or category labels to which respective pixels in the image belong.

19. The apparatus of claim 11, wherein the at least one mode corresponding to the image comprises one or more of: a visible image mode, a depth mode, a Computed Tomography (CT) mode, an infrared mode, a millimeter wave mode or an ultrasound mode.

20. The method of claim 4, wherein said determining whether the iteration condition is met comprises:
    determining whether an accumulated number of iterations has reached a predetermined number threshold, and if so, determining that the iteration condition is not met, or otherwise determining that the iteration condition is met, or
    determining whether a modified semantic segmentation result currently outputted from the convolutional neural sub-network at the stage and a semantic segmentation result previously outputted from the convolutional neural sub-network at the stage satisfy a convergence condition, and if so, determining that the iteration condition is not met, or otherwise determining that the iteration condition is met.

21. The apparatus of claim 13, wherein the processor being operative to execute the at least one machine executable instruction to determine whether the iteration condition is met comprises the processor being operative to execute the at least one machine executable instruction to:
    determine whether an accumulated number of iterations has reached a predetermined number threshold, and if so, determine that the iteration condition is not met, or otherwise determine that the iteration condition is met, or
    determine whether a modified semantic segmentation result currently outputted from the convolutional neural sub-network at the stage and a semantic segmentation result previously outputted from the convolutional neural sub-network at the stage satisfy a convergence condition, and if so, determine that the iteration condition is not met, or otherwise determine that the iteration condition is met.

* * * * *

UNITED STATES PATENT AND TRADEMARK OFFICE
CERTIFICATE OF CORRECTION

PATENT NO. : 11,205,271 B2
APPLICATION NO. : 16/577753
DATED : December 21, 2021
INVENTOR(S) : Hengchen Dai and Naiyan Wang It is certified that error appears in the above-identified patent and that said Letters Patent is hereby corrected as shown below:

In the Claims

In Column 21, Line 30, in Claim 4, delete "result; and" and insert -- result and --, therefor.

In Column 21, Line 48, in Claim 5, delete "result; and" and insert -- result and --, therefor.

In Column 21, Line 63, in Claim 6, delete "result; and" and insert -- result and --, therefor.

In Column 24, Line 11, in Claim 14, delete "result; and" and insert -- result and --, therefor.

Signed and Sealed this
Tenth Day of May, 2022

Katherine Kelly Vidal
*Director of the United States Patent and Trademark Office*